United States Patent [19]

Goto

[11] Patent Number: 4,761,666

[45] Date of Patent: Aug. 2, 1988

[54] CAMERA CAPABLE OF FLASH PHOTOGRAPHY

[75] Inventor: Tetsuro Goto, Funabashi, Japan

[73] Assignee: Nippon Kogaku K. K., Tokyo, Japan

[21] Appl. No.: 73,471

[22] Filed: Jul. 15, 1987

[30] Foreign Application Priority Data

Jul. 20, 1986 [JP] Japan ................................. 61-110864

[51] Int. Cl.⁴ ............................................ G03B 15/05
[52] U.S. Cl. ...................................... 354/133; 354/147
[58] Field of Search ........................ 354/133, 146, 147

[56] References Cited

U.S. PATENT DOCUMENTS 4,174,897 11/1979 Matsumoto ........................ 354/133

Primary Examiner—Michael L. Gellner
Attorney, Agent, or Firm—Shapiro and Shapiro

[57] ABSTRACT

In a camera having a focal plane shutter, a magnet restrains the rearward shutter curtain in response to the supply of power to the magnet. A control device controls the period of power supply, and the restraint of the rearward shutter curtain is released when the power supply is terminated. A detecting circuit detects the termination of the power supply and outputs a detection signal. Another detecting circuit responsive to the movement of the forward shutter curtain outputs another detection signal. A selector selects one of the detection signals and inputs the selected signal to a starting circuit, which responds to the selected signal to start a flash emission.

10 Claims, 4 Drawing Sheets

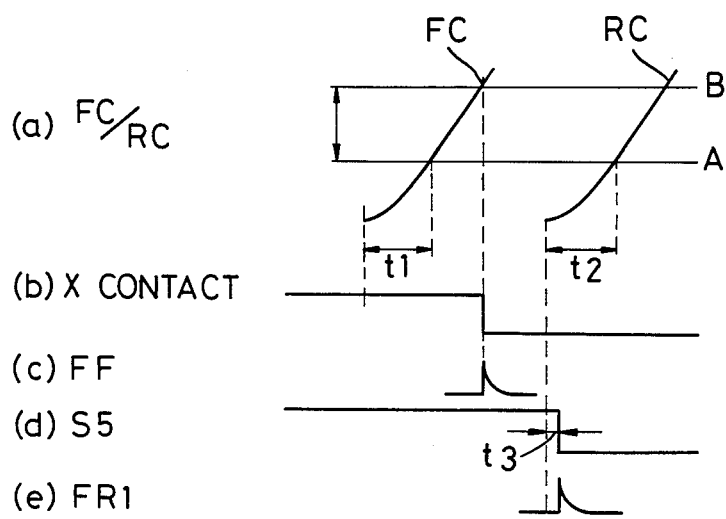

CAMERA CAPABLE OF FLASH PHOTOGRAPHY

BACKGROUND OF THE INVENTION

1. Field of the Invention

This invention relates to a camera capable of flash photography, and in particular to a camera improved so as to emit light simultaneously with the start of movement of the rearward shutter curtain of a focal plane shutter.

2. Related Background Art

In a camera with a focal plane shutter, there has heretofore been proposed the so-called rearward shutter curtain synchronization in which an electronic flash device is caused to emit light immediately before the rearward shutter curtain begins to be closed, that is, immediately before the rearward shutter curtain starts to be moved. In such prior-art camera, a rearward shutter curtain switch provided to output a trigger signal for starting the wind-up of the motor drive, i.e., a switch adapted to be closed with the start of movement of the rearward shutter curtain, is used also as a switch for producing a trigger signal for rearward shutter curtain synchronization.

However, this rearward shutter curtain switch is a mechanical contact and therefore has suffered from a disadvantage that there is certainly a delay time after the start of movement of the rearward shutter curtain and before the curtain is closed.

This will hereinafter be described with reference to FIG. 5 of the accompanying drawings. FIG. 5(a) indicates the locuses of the forward and rearward shutter curtains relative to the film picture plane by FC and RC, respectively. In this figure, A indicates the position in which the end of the shutter curtain appears in the exposed area of the film, and B indicates the position in which the end of the shutter curtain leaves the exposed area of the film. From FIG. 5(a), it is clear that both the forward and rearward shutter curtains have auxiliary movement during times $t_1$ and $t_2$ from after the start of movement thereof until the shutter curtain appears in the picture plane. Referring to FIGS. 5(d) and 5(e), the aforementioned rearward shutter curtain switch which is a mechanical contact is certainly closed in a delay time $t_3$ after the start of movement of the rearward shutter curtain, and on the basis of this ON signal, the light emission of the electronic flash device is obtained at a timing indicated by FR1.

In recent years, however, higher speeds of shutters have been contrived and the auxiliary movement time $t_2$ tends to be very much shortened, and depending on the delay time $t_3$, the rearward shutter curtain appears in the picture plane before the flashing of the electronic flash device is not terminated and thus, eclipse or irregularity of exposure occurs. Also, the light emission of the electronic flash device depends on the mechanical contact, and this has led to inferior reliability.

Heretofore, as shown in FIGS. 5(b) and 5(c), in the case of forward shutter curtain synchronization, the light emission of the electronic flash device has been obtained at a timing indicated at FF by an x contact being closed simultaneously with the termination of movement of the forward shutter curtain.

SUMMARY OF THE INVENTION

It is the object of the present invention to provide a camera capable of flash photography in which light emission certainly takes place within the period of auxiliary movement of the rearward shutter curtain and flashing is terminated within that period.

The camera of the present invention is provided with a light emission control circuit for controlling a flash device so as to emit light by the use of a movement starting signal produced when the magnetic force restraining the rearward shutter curtain of the focal plane shutter is demagnetized.

The rearward shutter curtain of the focal plane shutter starts to be moved by the movement starting signal and at the same time, by that movement starting signal, the light emission control circuit directly controls the start of light emission so that the flash device emits light.

DESCRIPTION OF THE DRAWINGS

FIG. 5 is a time chart illustrating an example of the prior art.

DESCRIPTION OF THE PREFERRED EMBODIMENTS

First Embodiment

Figure 1:
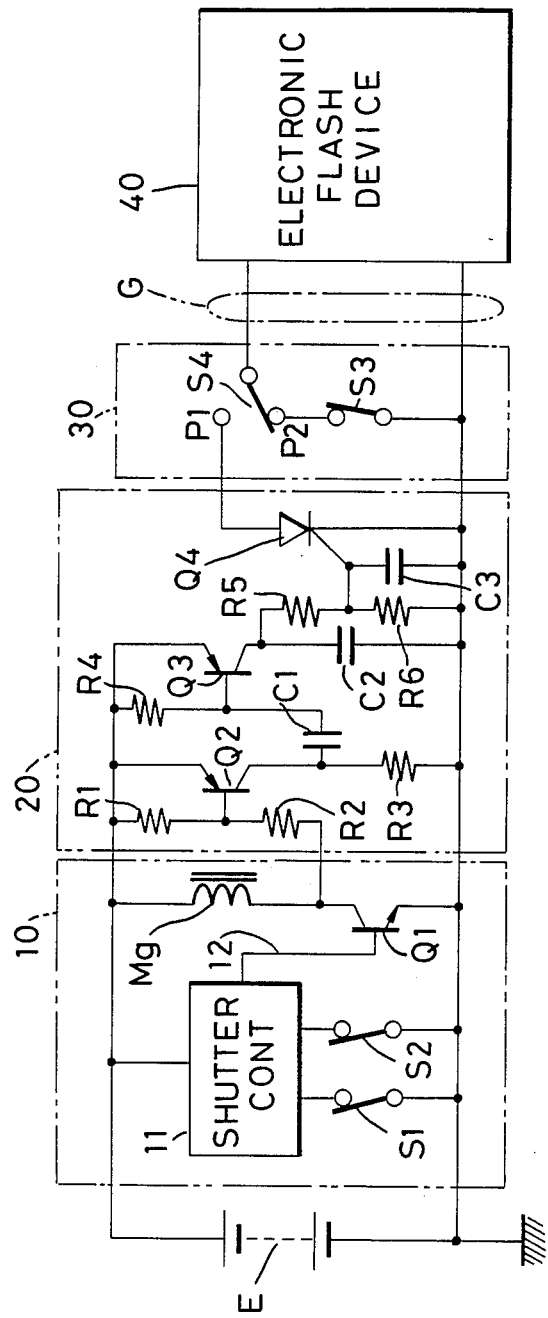
FIG. 1 is a circuit diagram in a first embodiment of the present invention.

FIG. 1 shows a first embodiment of the present invention in which a trigger signal for rearward shutter curtain synchronization is taken out from a transistor Q1 which drives a rearward shutter curtain holding magnet Mg.

The first embodiment is comprised by a shutter control block 10 for controlling movement of the forward and rearward shutter curtains of a focal plane shutter in accordance with a set shutter time, a rearward shutter curtain synchro circuit block 20 for causing an electronic flash device 40 to emit light by a rearward shutter curtain movement starting signal, and a selecting circuit block 30 for selecting one of rearward shutter curtain synchronization and forward shutter curtain synchronization which is a used tunning form.

The shutter control block 10 has a shutter control circuit 11 which outputs a hold signal of high level and a movement starting signal of low level to the transistor Q1 which will be described later, a timing switch S1 adapted to be opened in response to the starting of the movement of the forward shutter curtain and to be closed in response to the next film advance after the termination of exposure, a switch S2 adapted to be opened when a quick return mirror is moved up after shutter release and to be closed when the quick return mirror is again being moved down after the termination of exposure, a magnet Mg for holding the rearward shutter curtain, and the transistor Q1 inserted in the power supply path to the magnet Mg.

The rearward shutter curtain synchro circuit block 20 has a transistor Q2 adapted to be turned on when the transistor Q1 is in its conductive state, a capacitor C1 adapted to be charged when the transistor Q2 is in its non-conductive state and to be discharged when the transistor Q2 is in its conductive state, a transistor Q3 adapted to be turned on when the capacitor C1 is being charged, a capacitor C2 adapted to be charged when the transistor Q3 is turned on and to be discharged at a predetermined time constant when the transistor Q3 is turned off, a thyristor Q4 adapted to be turned on by the turn-on of the transistor Q3 and to maintain turned on even during the discharge of the capacitor C2, a noise preventing capacitor C3 and resistors R1–R6.

The selecting circuit block 30 has a switch S4 for selecting one of the forward shutter curtain synchronization and the rearward shutter curtain synchronization, and a switch (x contact) S3 for conducting a synchro terminal G with the switch S4 when the forward shutter curtain synchronization is selected. Letter E designates a battery.

In the above-described construction, light emission control means is constituted by the rearward shutter curtain synchro circuit block 20 and the selecting circuit block 30.

Figure 2:
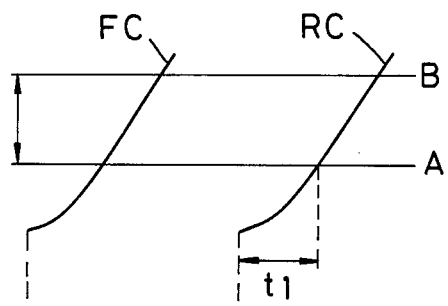
FIG. 2 is a time chart in the signals of the essential portions of the FIG. 1 embodiment.

Operation of such a control system will now be described with reference to the time chart of FIG. 2. The state before shutter release will first be described. The timing switch S1 is in its closed state, and the mirror switch S2 is in its closed state. The transistor Q2 is in its non-conductive state, the capacitor C1 has completed being charged by the resistors R4 and R3, the transistor Q3 is in its non-conductive state and accordingly, the thyristor Q4 is not operated.

When the quick return mirror is moved up after shutter release, the mirror switch S2 is opened (point a) and, when the shutter control circuit 11 renders a signal 12 into a high level (point b), the transistor Q1 is turned on to drive the magnet Mg (point c), whereby restraint of the rearward shutter curtain is started. By the turn-on of the transistor Q1, in the rearward shutter curtain synchro circuit block 20, the transistor Q2 is turned on by the resistor R2 and the charge stored in the capacitor C1 is discharged. At this time, the transistor Q3 and the thyristor Q4 remain turned off.

When the forward shutter curtain mechanically starts its movement after the transistor Q1 is turned on, the timing switch S1 is opened (point d) and the shutter control circuit 11 starts to calculate time (shutter time), and at a point of time whereat a preset time has been reached, the shutter control circuit 11 renders the signal 12 into a low level (point e), whereupon the transistor Q1 is turned off. Thereupon, the attraction of the magnet Mg disappears (point f), and the rearward shutter curtain is released from restraint and is moved in the picture plane, whereafter exposure is completed. Also, by the turn-off of the transistor Q1, the transistor Q2 is turned off. Then, the capacitor C1 is charged for a predetermined time through the resistors R3 and R4, and the transistor Q3 is maintained turned on for the predetermined time. Upon the turn-on of the transistor Q3, a voltage is applied to the gate of the thyristor Q4 by the resistors R5 and R6 and therefore, the thyristor Q4 is turned on. At this time, the capacitor C2 is charged with the inflow charge while the transistor Q3 is turned on for a short time, and a voltage is still applied to the gate of the thyristor Q4 for a predetermined time after the transistor Q3 is turned off.

If the switch S4 of the selecting circuit block 30 has been changed over to a rearward shutter curtain synchro position P1, the synchro terminal G conducts and a trigger signal occurs (point g) and the electronic flash device 40 emits light. The electronic flash device 40 contains therein a power source different from the power source E. Also, if the switch S4 has been changed over to a forward shutter curtain synchro position P2, the synchro terminal G conducts by the switch S3 adapted to be closed upon termination of the movement of the forward shutter curtain and the flash device 40 can be caused to emit light by the forward shutter curtain synchronization.

Second Embodiment

Figure 3:
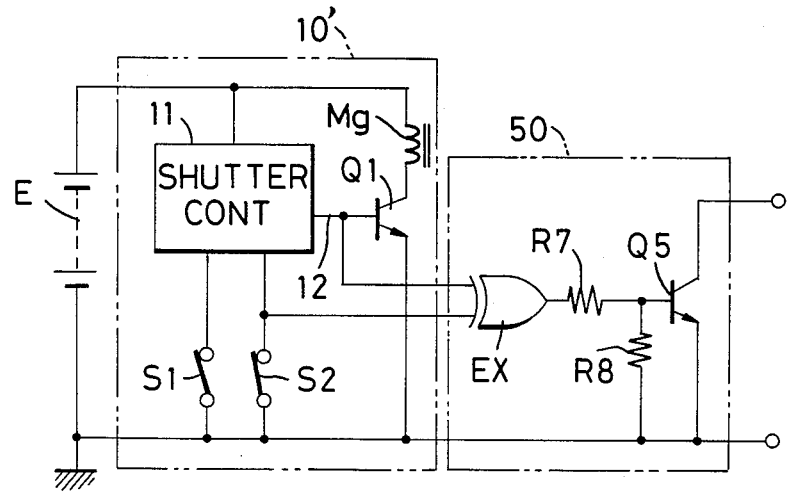
FIG. 3 is a circuit diagram in a second embodiment of the present invention.

A second embodiment of the present invention is shown in FIG. 3. This embodiment is a curtain in which the trigger signal by the rearward shutter curtain synchronization is obtained without using the time constant circuit comprising capacitors C1, C2, etc. as shown in FIG. 1.

That is, a rearward shutter curtain synchro circuit block 50 has an exclusive logic sum gate Ex to which the signals from the shutter control circuit 11 (the base of the transistor Q1) and the mirror switch S2 are input, and a transistor Q5 adapted to be turned on and turned off by the signal from the gate Ex. This transistor Q5, like the thyristor Q4 of FIG. 1, has its collector connected to a contact P1 and has its emitter connected to the contact between the switch S3 and the grand. The other circuit block 10' somewhat differs in electrical connection from the circuit block 10 of FIG. 1.

In FIG. 3, blocks 30 and 40 are similar to those in FIG. 1 and therefore need not be described.

Operation of the present embodiment will now be described with reference to FIG. 2.

The exclusive logic sum gate Ex outputs a signal of high level (point e→point h) when a movement starting signal of low level is output from the shutter control circuit 11 (point e) and the mirror switch S2 is opened. Thereby, the transistor Q5 is turned on between point e to point h and, if the switch S4 is in the position P1, a trigger signal occurs (g) at point e and the synchro terminal G conducts, and accordingly, at point e, the flash device starts to emit light. That is, in this embodiment, the flash device starts to emit light directly by the movement starting signal output from the shutter control circuit 11.

According to this circuit system, as described above, the timing of the rearward shutter curtain synchronization is obtained in the same manner as that described with reference to FIG. 1 and in addition, the timing at which the transistor Q5 is turned off depends on only the sequence of the camera and therefore does not become irregular depending on the values of the resistors and capacitors as in FIG. 1 and also, it becomes easy to constitute the rearward shutter curtain synchro circuit block 50 by an IC (integrated circuit).

In the foregoing embodiments, the magnet has been described with respect to the attraction type, namely, the case where the magnet is supplied with power upon upward movement of the mirror to restrain the rearward shutter curtain and the restraint is released upon termination of the power supply, but alternatively, the magnet may be of the so-called combination type, namely, the type in which the rearward shutter curtain is mechanically restrained by a permanent magnet in response to upward movement of the mirror and the magnet is supplied with power for a short time when the restraint is released, whereby the rearward shutter curtain is liberated from the magnetic force. In this latter case, in the first embodiment, the portion for generating a pulse of short time which portion comprises the transistor Q2, the capacitor C1 and the resistors becomes unnecessary in the rearward shutter curtain synchro circuit block 20 and thus, the construction will become simpler.

Figure 4A:
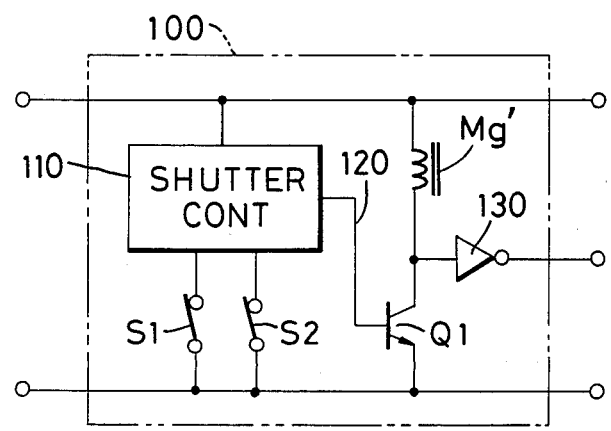
FIG. 4A is a block diagram showing a modification of the first embodiment.
Figure 4B:
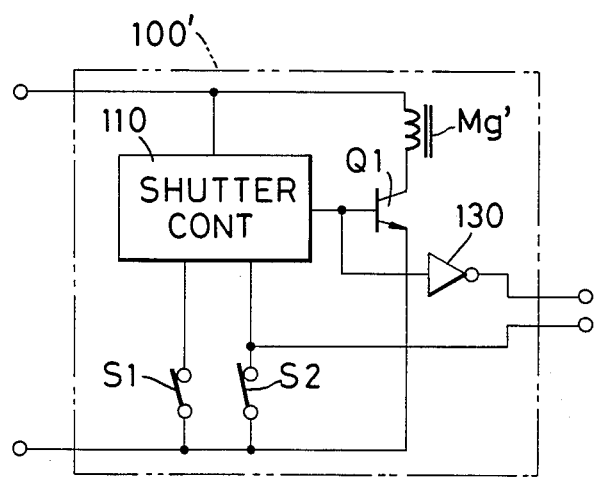
FIG. 4B is a block diagram showing a modification of the second embodiment.

FIGS. 4A and 4B show examples in which the magnet Mg of the first and second embodiments is a combination type magnet Mg'.

A block 100 shown in FIG. 4A replaces the block 10 of FIG. 1, and the difference of the block 100 from the block 10 is that the level of a signal 120 input to the base of the transistor Q1 by a shutter control circuit 110 is inverted relative to the level of the signal 12. Accordingly, an inverter 130 is inserted between the resistor R2 of the block 20 and the collector of the transistor Q1. Blocks 20, 30 and 40 are omitted.

A block 100' shown in FIG. 4B differs from the block 10' of FIG. 3 in respect of the control circuit 110, the magnet Mg' and the inverter 130. Blocks 40 and 50 are omitted.

As described above, according to the construction of the present invention, rearward shutter curtain synchronization becomes possible by merely adding a simple circuit to a conventional electronic shutter camera.

I claim:

1. A camera in which exposure of a film is accomplished by movement of the forward shutter curtain of a focal plane shutter and movement of the rearward shutter curtain of the focal plane shutter, including:
    magnet means for restraining the rearward shutter curtain of said focal plane shutter by a magnetic force;
    power supply means for supplying power to said magnet means, said magnet means being adapted to produce a magnetic force in response to the supply of power by said power supply means;
    control means for controlling the period of power supply of said power supply means, said magnet means being adapted to release the restraint of said rearward shutter curtain in respone to the termination of said power supply;
    a detecting circuit electrically connected to said power supply means for electrically detecting the termination of the power supply by said power supply means and outputting a detection signal;
    another detecting circuit responsive to the movement of the forward shutter curtain of said focal plane shutter to output another detection signal;
    flash emitting means for emitting flash toward an object to be photographed;
    a starting circuit; and
    selecting means for selecting one of said detection signals and inputting the selected signal to said starting circuit, said starting circuit being responsive to the signal selected by said selecting means to start the flash emission of said flash emitting means.

2. A camera according to claim 1, wherein said selecting means has an operating member, and said selecting means is responsive to the operation of said member to select one of said detection signal and said another detection signal.

3. A camera in which exposure of a film is accomplished by movement of the forward shutter curtain of a focal plane shutter and movement of the rearward shutter curtain of the focal plane shutter, including:
    magnet means for restraining the rearward shutter curtain of said focal plane shutter by a magnetic force;
    power supply means for supplying power to said magnet means, said magnet means being adapted to produce a magnetic force in response to the supply of power by said power supply means;
    control means for outputting a stop signal for stopping the power supply of said power supply means and controlling the period of power supply of said power supply means, said magnet being responsive to the termination of said power supply to release the restraint of said rearward shutter curtain;
    a detecting circuit electrically connected to said control means for electrically detecting that said stop signal has been output and outputting a detection signal;
    another detecting circuit responsive to the movement of the forward shutter curtain of said focal plane shutter to output another detection signal;
    flash emitting means for emitting flash toward an object to be photographed;
    a starting circuit; and
    selecting means for selecting one of said detection signals and inputting the selected signal to said starting circuit, said starting circuit being responsive to the signal selected by said selecting means to start the flash emission of said flash emitting means.

4. A camera according to claim 3, wherein said control means has terminal means for outputting said stop signal, and said detecting circuit is electrically connected to said terminal means.

5. A camera according to claim 3, wherein said selecting means has an operating member, and said selecting means is responsive to the operation of said member to select one of said detection signal and said another detection signal.

6. A camera in which exposure of a film is accomplished by movement of the forward shutter curtain of a focal plane shutter and movement of the rearward shutter curtain of the focal plane shutter, including:
    magnet means for restraining the rearward shutter curtain of said focal plane shutter;
    power supply means for supplying power to said magnet means, said magnet means being adapted to release the restraint of said rearward shutter curtain by being supplied with power by said power supply means;
    starting means for causing said power supply means to start the supply of power to said magnet means;
    a detecting circuit electrically connected to said power supply means for electrically detecting the start of the power supply to said magnet means and outputting a detection signal;
    another detecting circuit responsive to the movement of the forward shutter curtain of said focal plane shutter to output another detection signal;
    flash emitting means for emitting flash toward an object to be photographed;
    a starting circuit; and
    selecting means for selecting one of said detection signals and inputting the selected signal to said starting circuit, said starting circuit being responsive to the signal selected by said selecting means to start the flash emission of said flash emitting means.

7. A camera according to claim 6, wherein said selecting means has an operating member, and said selecting means is responsive to the operation of said member to select one of said detection signal and said another detection signal.

8. A camera in which exposure of a film is accomplished by movement of the forward shutter curtain of the focal plane shutter and movement of the rearward shutter curtain of the focal plane shutter, including:

magnet means for restraining the rearward shutter curtain of said focal plane shutter;

power supply means for supplying power to said magnet means, said magnet means being adapted to release the restraint of said rearward shutter curtain by being supplied with power by said power supply means;

control means for outputting a start signal for causing said power supply means to start the supply of power to said magnet means;

a detecting circuit electrically connected to said control means for electrically detecting that said start signal has been output and outputting a detection signal;

another detecting circuit responsive to the movement of the forward shutter curtain of said focal plane shutter to output another detection signal;

flash emitting means for emitting flash toward an object to be photographed;

a starting circuit; and selecting means for selecting one of said detection signals and inputting the selected signal to said starting circuit, said starting circuit being responsive to the signal selected by said selecting means to start the flash emission of said flash emitting means.

9. A camera according to claim 8, wherein said control means has terminal means for outputting said start signal, and said detecting circuit is electrically connected to said terminal means.

10. A camera according to claim 8, wherein said selecting means has an operating member, and said selecting means is responsive to the operation of said member to select one of said detection signal and said another detection signal.

* * * * *